Oct. 3, 1933.　　　　L. M. WOOLSON　　　　1,928,775
INTERNAL COMBUSTION ENGINE
Filed July 21, 1930　　　2 Sheets-Sheet 1

Inventor
LIONEL M. WOOLSON, DECEASED
BY HIS EXECUTRIX
EMMA F. WOOLSON
By
Attorney Oct. 3, 1933.    L. M. WOOLSON    1,928,775
INTERNAL COMBUSTION ENGINE
Filed July 21, 1930    2 Sheets-Sheet 2
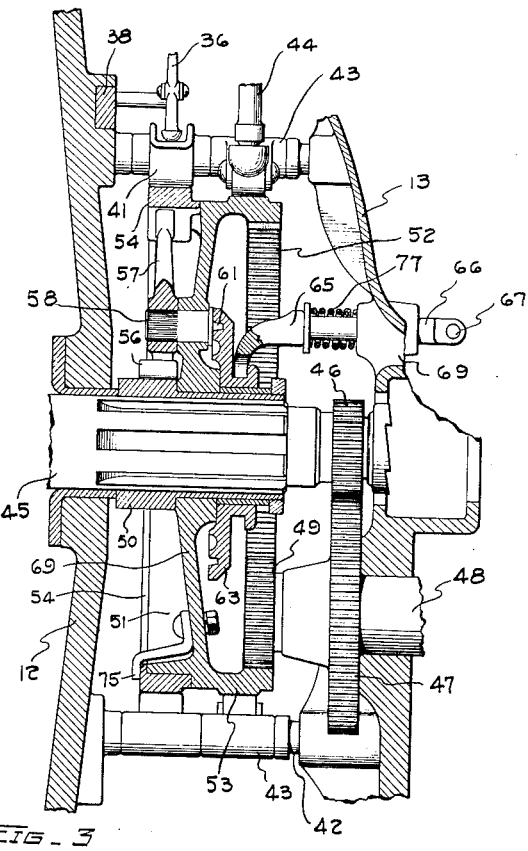
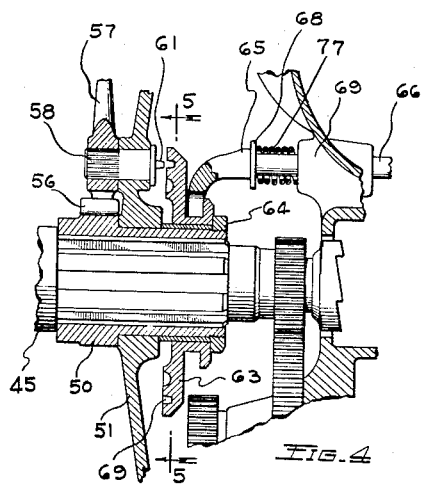
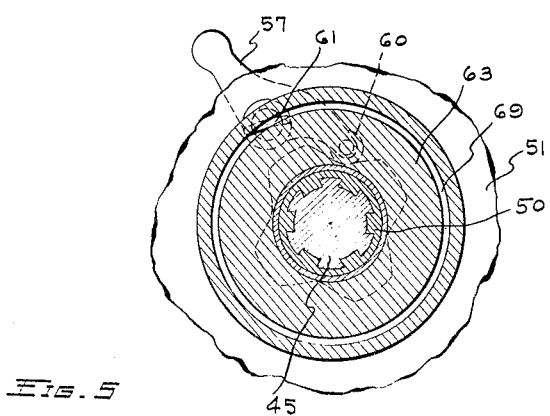
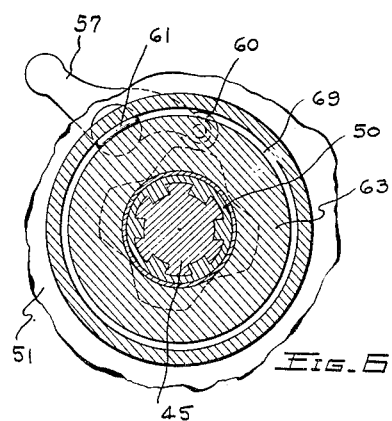
Inventor
LIONEL M. WOOLSON, DECEASED
BY HIS EXECUTRIX
EMMA F. WOOLSON
By Milton Tibbetts
Attorney Patented Oct. 3, 1933

1,928,775

UNITED STATES PATENT OFFICE 1,928,775

INTERNAL COMBUSTION ENGINE

Lionel M. Woolson, deceased, late of Detroit, Mich., by Emma F. Woolson, executrix, Bloomfield Village, Mich., assignor to Packard Motor Car Company, Detroit, Mich., a corporation of Michigan Application July 21, 1930. Serial No. 469,321

15 Claims. (Cl. 74—14)

This invention relates to internal combustion engines and more particularly to engines of the compression-ignition.

In a high speed compression-ignition engine, the time during which the fuel is injected extends over a very small angle of the crank shaft movement, and, therefore, it is necessary that the fuel penetrate the compressed air charges sufficiently to cause a homogeneous mixture therewith in a very short space of time, in other words the atomized fuel must be mixed thoroughly with the oxygen in the compressed air charges to secure efficiency, continued operation in the low speed range, and ease in starting. In one type of compression-ignition engine, fuel is injected into compressed air charges in the combustion chambers by pressure mechanism actuated in accordance with the engine speed, and when the engine is running in its slower speed range, the pressure at which fuel is injected is considerably less than that at which it is injected when the engine is running in its higher speed range. There is a minimum pressure at which fuel can be injected into the compressed air, particularly in an engine of the high speed type capable of running at considerably more than twelve hundred R. P. M., and still support combustion. When an engine of the type referred to is idling or being started, the developed pump pressure is not sufficient to produce the required fuel atomization and fuel pressure to insure continued operation or ease in starting.

An object of the invention is to provide a compression-ignition engine with fuel injecting mechanism which is operated during the slow speed range so that the fuel is injected into the compressed air charges with sufficient force to result in a fuel mixture which will insure combustion.

Another object of the invention is to provide mechanism for actuating the fuel injection devices of a compression-ignition engine which will actuate plungers at a speed to cause sufficient penetration of the compressed air charges by the fuel to support combustion regardless of the speed of the engine.

A further object of the invention is to provide an engine driven cam for actuating fuel injection devices which is formed and actuated so that impulse movements thereof are produced, when the engine is running in its low speed range, to cause the fuel injection mechanism to move faster on the injection strokes than would result from the rotation of the cam as normally driven by the engine.

Still another object of the invention is to provide a two-part cam in which a lobe section is associated with a driven hub section so that it will rotate therewith, and will have impulse movements relative thereto during contact of the lobes with the fuel pump mechanism during the slower speed range of the engine.

A still further object of the invention is to provide engine driven cam mechanism for actuating fuel injection devices which can be controlled so that when the engine is running in its lower speed range, the cam in addition to its normal rotation will rotate, during its actuating contact with the pumps, impulsively at a faster rate of speed than that caused by the normal engine drive.

These and other objects of the invention will appear from the following description taken in connection with the drawings, which form a part of this specification, and in which:

Fig. 3 is a sectional view taken on line 3—3 of Fig. 1;

Fig. 4 is a similar view with the mechanism shown arranged for slow speed engine operation;

Fig. 5 is a sectional view taken on line 5—5 of Fig. 4;

Fig. 6 is a similar sectional view with the mechanism associated for the high speed range of the engine operation.

Figure 1:
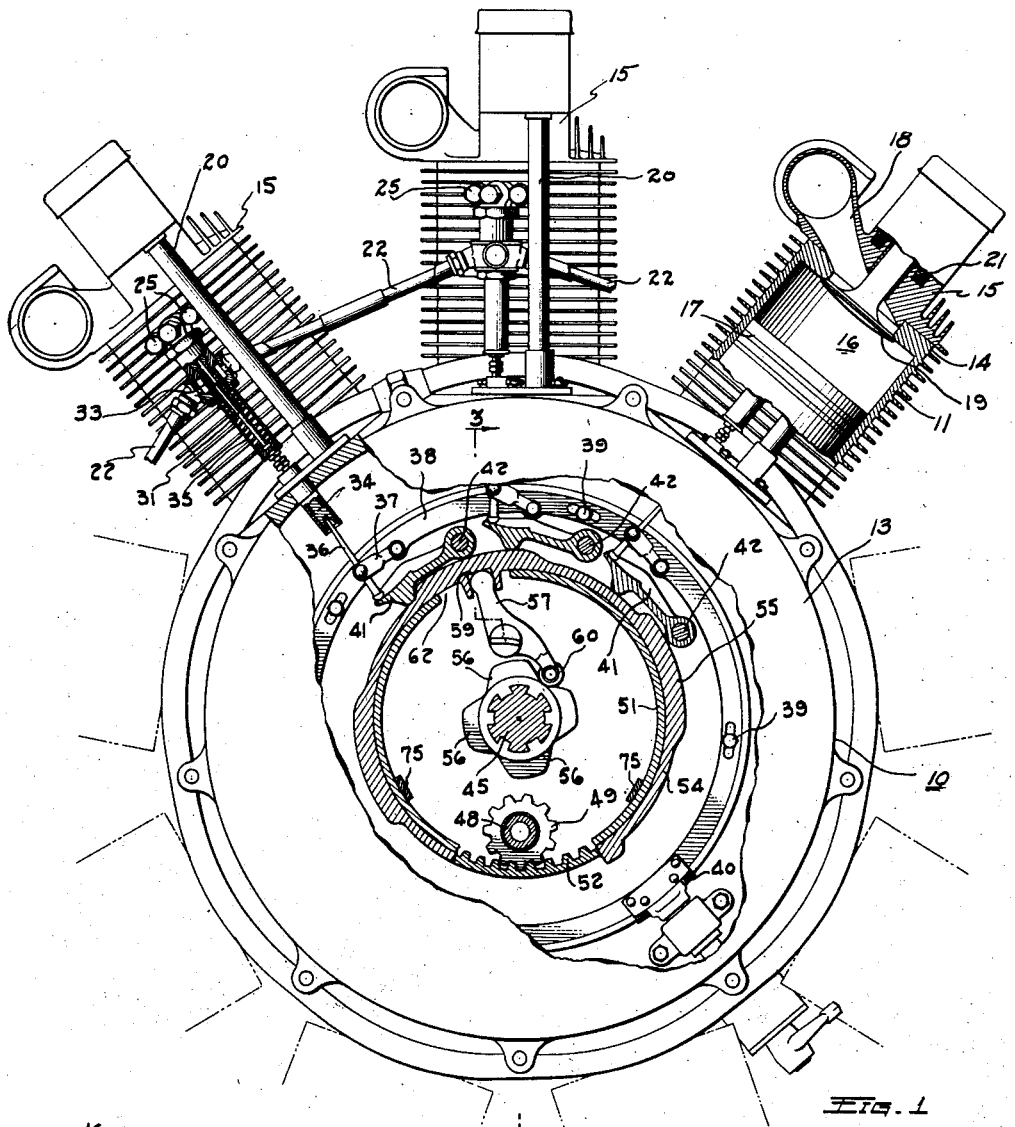
Fig. 1 is a rear end elevation of a compression-ignition type of engine, partially broken away and partially in section to show the fuel injection mechanism.
Figure 2:
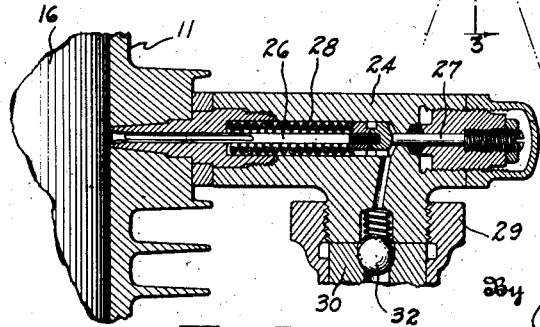
Fig. 2 is a fragmentary sectional view of one of the fuel injection nozzles associated with an engine cylinder.

Referring to the drawings by characters of reference, 10 indicates the crank case of an internal combustion engine of the Diesel or compression-ignition type from which a plurality of cylinders each extend radially. The interior of the crank case is divided into two compartments by a diaphragm 12, and a removable cover plate 13 closes the rear end of the crank case.

The cylinders are each preferably formed as a steel forging which includes a barrel 11 and an integral dome 14, and secured upon each of such domes is a head 15. In order to provide for air being drawn into and exhaust expelled from the combustion chamber 16, which is between the piston 17 and the dome, there is provided a single Venturi passage 18 through the head and dome of each cylinder which extends at an angle to the cylinder axis and tangentially of the inner wall thereof. This arrangement of ports will cause a full delivery of air to the cylinders, and in a manner such that it will rotate after entering the combustion chambers. In order to control the flow through each of the Venturi passages, there is provided a valve 19 which is moved to an open position during the air intake and exhaust strokes by suitable mechanism driven by the crank shaft and extending through the crank case and housings 20, while a plurality of springs 21 are associated with each valve to normally close the same.

Liquid fuel, in atomized form and under a high pressure, is injected into each of the cylinders during the air compression strokes by means of separate injection devices each consisting of a nozzle section and a pump section. The nozzle sections of the several units are connected together by fuel feeding manifold sections 22 connected in circuit with a source of fuel supply and a slow speed pump (not shown).

Each nozzle includes a barrel 24 having the forward end thereof extending through an aperture in a cylinder wall, and the nozzle and pump units are secured rigidly to the cylinders by bolts 25 which extend through flanges forming a part of the nozzle section. A chamber extends axially through the major portion of the nozzle section, and arranged therein is a valve element 26 which is provided with a conical head reciprocable within the outer end of the nozzle chamber. Associated with the other end of the valve member is a stop 27 which is adjusted to limit the inward movement of the valve heads so that they will never quite close. A coil spring 28 is arranged to normally urge each valve into its position of nearest closure. A pump casing 29 is screwed onto a depending neck portion of the nozzle body, and arranged within the pump casing is a barrel 30 within which the plunger 31 is reciprocated. There is a passage establishing communication between the pump barrel and the nozzle chamber, such passage having therein a one-way valve 32 which prevents return of fuel oil from the nozzle into the barrel. The pump barrel and its casing are provided with a plurality of aligned ports 33 which are arranged to communicate with the fuel feeding manifold 22 so that when the plungers 31 uncover the ports, oil will be moved into the nozzle and pump barrels to maintain the same full of oil, such communication being cut off when the plungers pass the ports in their injection strokes.

The plunger push rods 34 extend into the interior of the crank case and are arranged to engage with each plunger structure and cause movement thereof in a direction to close the ports 33, and to displace fuel oil from the nozzles into the cylinders upon further movement thereof. Springs 35 are arranged to normally move the plungers into a position uncovering the ports 33. A rod 36 is associated with each push rod and is pivotally connected by a link 37 to a ring 38 which is secured by bolts 39 to the diaphragm 12, such ring being provided with arcuate slots to permit rotation thereof. When the ring is rotated by means of a rack and pinion 40, the links 37 will be moved to vary the angular relation of the rods 36, relative to the push rods 34, and in this manner the stroke of the plungers 31 beyond the ports 33 can be regulated, thus varying the quantity of fuel oil injected into the cylinders. A slipper 41 is arranged to be associated with each of the rods 36 and such slippers are pivotally mounted upon the shafts 42 carried by the end wall 13 and the partition 12. These slippers are provided with an arcuate surface against which the rods 36 are held by the springs 35. Also mounted upon the shafts 42 beside the slippers 41 are slippers 43 with each of which a rod 44 is associated for actuating the valve opening mechanism extending through the housings 20.

A crank shaft 45 extends axially through the crank case and is provided adjacent its rear end with a gear 46 which meshes with a gear 47 carried by the shaft 48, and upon such shaft is another gear 49. A cam 50 is fixed to a splined portion of the crank shaft, and rotatably carried by an extended reduced hub portion of the cam 50 is a cam member 51 which is provided with an internal gear 52 with which the gear 49 is meshed. Through the gearing 46, 47, 49 and 52, the cam member is rotated at a reduced speed, preferably at one-eighth crank shaft speed, and in an anti-clockwise direction while the crank shaft rotates in a clockwise direction, looking at the rear end of the engine. On the rear portion of the periphery of the cam member there is provided a plurality of lobes 53 for actuating the slippers 43 during rotation of the cam member, such lobes being arranged for a desired timing of such actuation.

Associated with the forward periphery of the cam member 51 is a circular rim 54 having a plurality of lobes 55 projecting therefrom, such rim encircles the cam member and is associated therewith so that it can be rotated as a unit therewith or it can be rotated therewith and given impulse movements in the same direction as that of its rotation so that it periodically rotates faster than the cam member. Brackets 75 are secured to the cam member 51 and retain the rim member axially in position. The lobe carrying rim portion of the cam member is arranged adjacent and interiorly of the slippers 41 which actuate the fuel pumps in their effective strokes. There are four of these cam lobes and as they are associated with a nine-cylinder radial engine having a slipper for actuating a fuel pump mechanism associated with each cylinder, there will be one actuation of each fuel pump in every two revolutions of the crank shaft because of the geared-down driving ratio.

The cam 50 is provided with four lobes 56 arranged in the same vertical plane as the rim lobes 55 for actuating a lever 57 secured to the pin 58 which is pivotally carried by the cam member 51. The outer end of such lever extends into a recess 59 formed in the rim 51 whereas the inner end of the lever carries a roller 60, and the rear end of the pin 58 is provided with an arcuate extension 61. The roller 60 is arranged to ride upon the periphery of the cam 50 when it is freely pivoted, and under such circumstances this relation of the lever with the lobes 56 will cause impulse movements of the rim 51 in the same direction as that in which the cam member is rotating, there being a slot 62 provided in the cam member to allow a limited pivotal movement of the lever 57. The cam 56, being fixed to the crank shaft, rotates in a clockwise direction looking at the rear of the engine and, therefore, in an opposite direction to that in which the cam member and the lobe carrying rim portion are being rotated through the gear mechanism. The lobes 56 are related with the lobes 55 so that just as the lobes 55 reach a point where they are about to engage and actuate the slippers 41, the lever 57 will ride up upon the lobes 56 and as the cam 50 is moving eight times faster than the cam member 51, an impulse movement will be imparted to the lobe carrying rim 51 causing its movement to be speeded up relative to its rate of travel with the cam member. The impulse movement gives a much faster action to the injection strokes of the fuel pumps, and consequently materially increases the pressure exerted thereby against the fuel as compared with that which would be normally developed if the lob carrying rim were rotating integrally with the cam member during slow speed engine operation as it does in the faster speed range of the engine.

In order to control the position of the lever 57 so that it will be either in contact or out of contact with the lobes of the cam 50, there is provided mechanism which can be controlled either automatically or manually. To this end, a plate 63 is mounted upon the extended hub portion of the cam 50 and is secured against axial displacement therefrom by the nut 64 which is screwed upon the end of the cam hub. A yoke member 65 engages the plate 63, and a shaft 66 extending from the yoke through the end wall 13 is provided with an aperture 67 at the end thereof for the attachment of suitable extension mechanism which can be actuated from a remote point. A spring 77 is arranged between a flange 68 and a boss 69 for normally pressing the yoke forwardly and thereby causing the circular recess 69 in the front end of the plate to telescope the arcuate extension 61 of the pin 58. When the extension 61 extends into the circular groove 69 in the control plate, the lever 57 will be in the position shown in Fig. 6, and in such relation the roller 60 will be held in a position such that the cam lobes 56 will not engage therewith. When in this position, the cam rim 54 will rotate as a unit with the cam member 51 and at the same speed therewith. When the yoke is moved rearwardly, the control plate 63 is moved to a point where the extension 61 will not be engaged, as shown in Figs. 4 and 5, and when in such relation the lever is free to follow the surface of the cam 50 and to be rocked as it rides the periphery of the lobes 56 so that impulses will be given to the cam rim 54 causing it to rotate faster than the cam member at the time the lobes 55 engage the slippers 41 to cause a fuel pump actuation.

The fuel pump actuating cam and its control mechanism is designed particularly for use when starting the engine and when running at idling speeds, because under such circumstances the crank shaft is rotating in its slow speed range and the normal actuation which would be imparted by the cam member does not provide sufficiently fast movement of the plungers to result in the proper pressure on the fuel injected into the air charges to insure a mixture which will support combustion. Due to the impulses at which the lobes 55 are moved in the slow speed range, a much increased pressure of the injected fuel will result, and likewise finer atomization results accordingly with the pressure because of the form of nozzle illustrated. It is found that the device herein described is of material benefit in the easy starting of a compression-ignition type of engine, and also, in sustaining continued combustion when the engine is running in its slow speed range.

While there is herein described in some detail a specific embodiment of the invention, which is deemed to be new and advantageous and specifically claimed, it is not desired to be understood that the invention is limited to the exact details of the construction, as it will be apparent that changes may be made therein without departing from the spirit or scope of the invention.

What is claimed is:

1. In a cam mechanism, a driven hub, a cam rim mounted to rotate with and relative to said hub, and driven means engageable in driving relation with said rim to cause rotative impulse movements thereof in advance of the normal rotation thereof with the hub.

2. In a cam mechanism, a driven hub, a cam rim mounted to rotate with said hub, a lever engaging said rim and movable with said hub, and driven means engageable with said lever to cause periodic oscillations thereof, the oscillation of said lever rotating the rim on the driven hub.

3. In a cam mechanism, a driven hub, a cam rim mounted to rotate with said hub, a lever pivotally mounted on the hub and engaging the rim, and driven means engageable with the lever to cause oscillations thereof, such movement of the lever rotating the rim relative to the hub.

4. In a cam mechanism, a driven hub, a cam rim mounted to rotate with and relative to said hub, a member driven at a faster speed than the hub, and means engaging the rim and actuated by the faster cam member to cause rotated impulse movements of the rim relative to the driven hub while rotating therewith.

5. Cam mechanism comprising a driven hub, a cam rim mounted to rotate with said hub, a lever engaging the rim, and cam means associated to rock the lever whereby imparting rotative impulse movements to the rim while rotating with the hub.

6. Cam mechanism comprising a driven hub, a cam rim mounted to rotate with said hub, a lever pivoted on the hub, cam means for rocking said lever to impart impulse rotative movements to the rim while rotating with the hub, and means for holding the lever out of engagement with the cam means.

7. Cam mechanism comprising a driven hub, a cam rim mounted to rotate with said hub, a pin rotatably mounted on the hub, a lever fixed to the pin and engaging the rim, means for oscillating said lever to cause rotation of said rim, and means engaging said pin to hold said lever out of engagement with said oscillating means.

8. Cam mechanism comprising a driven hub, a cam rim mounted to rotate with said hub, a pivoted lever engaging said rim and rotatable with said hub, cam means for engaging said lever to cause oscillations thereof whereby the cam rim is moved in a rotational direction relative to the rotating hub, said hub being driven at a speed which is a multiple of the speed at which the cam means is driven.

9. Cam mechanism comprising a hub having a circular flanged portion, a rim having lobes formed thereon mounted on the circular flanged portion of the hub, and means secured to said hub for engaging and retaining the rim on the flange.

10. In a cam mechanism, a driven sectional cam member, one section of said cam member having lobes thereon and being rotatable in a limited range relative to the other section, lever means pivoted to the cam member and engaging the lobe carrying section to cause impulse movements thereof in a rotational direction, means for rocking said lever means to cause the impulse movements of the lobe section of the cam, a plate normally engaging said lever means to retain it in ineffective relation, and means for shifting said plate to a position whereby the lever means is in impulse effecting relation between the lobe section of the cam and the rocking means.

11. Cam mechanism comprising a driven shaft, a cam hub, reduction driving means between the driven shaft and the cam hub, a cam rim mounted to rotate with said hub and being movable in a rotational direction relative thereto, a cam fixed to the driven shaft, and means actuated by said fixed cam and engaging said cam rim to impart rotative impulse movements thereto while rotating with the hub.

12. Cam mechanism comprising a driven hub, a cam rim mounted to rotate with and relative to said hub, and means associated with said rim for imparting rotative impulse movements thereto while rotating with the hub.

13. Cam mechanism comprising a driven member having a relatively rotatable lobe section, a lever for impulsively and intermittently moving the lobe carrying section in the direction of its normal rotative travel, and a control means for placing said lever into an active or inactive position.

14. Cam mechanism comprising a driven member having a lobe section rotatable with and relative to the other portion of the member, a lever pivoted to the member and engaging with the lobe carrying section, driven mechanism for rocking said lever, means automatically positioning said lever in relation to be rocked by said driven means, and means for shifting the lever out of position to be operated by the driven means.

15. Cam mechanism comprising a driven sectional cam member, one section of the member being rotatable with and relative to the other section and having lobes formed thereon, a lever engaging the lobe carrying section, another driven cam operating at a faster speed than the sectional cam for engaging and rocking said lever, a pin rotatably mounted on the sectional member to which the lever is fixed, one end of the pin having an arcuate extension, a plate having a circular groove adjacent the arcuate extension of the pin, means normally urging the plate into a position such that the arcuate extension travels in the circular groove therein and thereby holds the lever in a fixed inoperative relation with the cam member, and means for releasing the plate from the pin extension, the lever being free to engage the faster cam when the plate is released from the pin.

EMMA F. WOOLSON,
*Executrix of the Estate of Lionel M. Woolson, Deceased.*